United States Patent
Weckerle et al.

(10) Patent No.: US 11,913,486 B2
(45) Date of Patent: Feb. 27, 2024

(54) SCREW HAVING AN UNDER-HEAD COATING

(71) Applicant: OMNITECHNIK MIKROVERKAPSELUNGS GMBH, Munich (DE)

(72) Inventors: Anselm Weckerle, Munich (DE); Karin Lüdtke, Munich (DE); Markus Lang, Munich (DE); Sebastian Thau, Munich (DE); Alexander Kuhn-Weiss, Munich (DE); Agron Berisha, Munich (DE)

(73) Assignee: Omnitechnik Mikroverkapselungs GMBH, Munich (DE)

( * ) Notice: Subject to any disclaimer, the term of this patent is extended or adjusted under 35 U.S.C. 154(b) by 0 days.

(21) Appl. No.: 18/034,158

(22) PCT Filed: Oct. 29, 2021

(86) PCT No.: PCT/EP2021/080218
§ 371 (c)(1),
(2) Date: Apr. 27, 2023

(87) PCT Pub. No.: WO2022/090519
PCT Pub. Date: May 5, 2022

(65) Prior Publication Data
US 2023/0392635 A1 Dec. 7, 2023

(30) Foreign Application Priority Data
Oct. 30, 2020 (DE) .......................... 102020128662.7

(51) Int. Cl.
*F16B 25/00* (2006.01)
*F16B 33/00* (2006.01)

(52) U.S. Cl.
CPC ........ *F16B 25/0021* (2013.01); *F16B 33/004* (2013.01); *F16B 25/00* (2013.01)

(58) Field of Classification Search
CPC ...... F16B 25/00; F16B 25/0021; F16B 33/00; F16B 33/004
(Continued)

(56) References Cited

U.S. PATENT DOCUMENTS 3,399,589 A * 9/1968 Breed .................. F16B 33/004
411/428
4,657,460 A * 4/1987 Bien ..................... F16B 39/225
411/258
(Continued)

FOREIGN PATENT DOCUMENTS

AU    2011202566 A1    6/2012
AU    2016100659 A4    6/2016
(Continued)

OTHER PUBLICATIONS

English Translation of German Search Report dated May 31, 2021 for German Patent Application No. 102020128662.7.
(Continued)

*Primary Examiner* — Roberta S Delisle
(74) *Attorney, Agent, or Firm* — McCarter & English, LLP

(57) ABSTRACT

The present disclosure provides a screw and a screw assemblage. The screw includes a screw head and a screw shaft which protrudes from an underside of the screw head and has a self-forming or self-cutting thread, wherein the underside of the screw head has a bearing area and at least one annular recess extending around the shaft between the bearing area and the shaft, wherein a coating made of an elastic sealant is attached to the underside of the screw head.

12 Claims, 1 Drawing Sheet

(58) Field of Classification Search
USPC .............................................. 411/387.1, 914
See application file for complete search history.

(56) References Cited

U.S. PATENT DOCUMENTS

| | | | | |
|---|---|---|---|---|
| 4,730,970 | A * | 3/1988 | Hyner | C21D 9/0093 |
| | | | | 411/902 |
| 5,193,958 | A * | 3/1993 | Day | B05D 5/08 |
| | | | | 411/914 |
| 5,304,023 | A | 4/1994 | Toback et al. | |
| 7,195,437 | B2 * | 3/2007 | Sakamoto | F16B 33/06 |
| | | | | 411/428 |
| 2013/0047414 | A1 * | 2/2013 | Werthwein | F16B 25/0078 |
| | | | | 29/525.12 |
| 2014/0199135 | A1 * | 7/2014 | Hable | C09D 163/10 |
| | | | | 521/134 |

FOREIGN PATENT DOCUMENTS

| | | |
|---|---|---|
| DE | 69114017 T2 | 2/1997 |
| DE | 102010044887 A1 | 5/2011 |
| DE | 102012210791 A1 | 1/2014 |
| WO | WO 2006/043169 A1 | 4/2006 |

OTHER PUBLICATIONS

English Translation of German Patent Office Examination Report with dated Jun. 1, 2021 for German Patent Application No. 102020128662.7.

English Translation of Decision to Grant dated Jan. 2, 2022 for German Patent Application No. 102020128662.7.

English Translation of PCT International Search Report and Written Opinion dated Febraury 11, 2022 for PCT/EP2021/080218.

* cited by examiner

SCREW HAVING AN UNDER-HEAD COATING

CROSS-REFERENCE TO RELATED APPLICATIONS

This application is a 35 U.S.C. § 371 National Stage filing of International Application No. PCT/EP2021/080218, filed on Oct. 29, 2021, which claims priority to a German patent application filed on Oct. 30, 2020, and assigned Serial No. DE 10 2020 128 662.7.

BACKGROUND

The invention relates to a screw, comprising: a screw head; and a screw shaft which protrudes from an underside of the screw head and has a thread for screwing the screw into a body.

The prior art discloses metal-construction screws in which a washer which is arranged on the underside of the screw head has a coating on its underside. The coating serves to seal off the vicinity of the screw head in relation to a drill hole into which the screw is screwed, wherein the gasket of the underside of the washer abuts a surface of a body of the screw assemblage, forming a seal.

Providing the flights of metric or imperial external threads with a coating in order to produce a screw securing and/or sealing mechanism together with the internal thread into which the screw is screwed is also known.

In particular in static metal and scaffold construction and in the field of structural engineering and civil engineering, fundamentally different demands are made on load capacity and tightness which are associated with the fundamentally differentiated screw assemblage. This requires screws with a self-forming or self-tapping thread which ensure a reliable strength under a static load, a tightness against liquids such as for example water or oil, sufficient UV resistance, a simplicity and correctness of use and an ability to be smoothly screwed in until the screw head lies flat on the body and there is contact between the assembly partners even without preparing the body which is to be screwed into. A screw which is provided with an elastic gasket ring is known within this scope. This can achieve sufficient tightness and strength of the screw connection, but has the disadvantage that the gasket ring can get lost or forgotten and is degraded by UV rays, which can lead to intrusion into other material and therefore loss of the clamping force. In addition, the sealing disc can be damaged or destroyed as it is screwed in, leading to a susceptibility to failure. Furthermore, the manufacturing process is complex and costly.

SUMMARY

The invention is based on the object of specifying a screw, in particular one with a self-forming or self-tapping thread, which can be easily processed to produce a screw assemblage and which reliably prevents the penetration of media, in particular moisture, into the drill hole of a screw assemblage which accommodates a screw shaft of the screw, as well as minimising the loss of initial tension and thus increasing the durability of the connection. The invention is also preferably based on the object of avoiding some of the other mentioned disadvantages of existing screw designs having a self-forming or self-tapping thread and/or improving their results.

The screw in accordance with the invention should also be easy to manufacture and less costly to produce, transport and store and in particular able to fulfil a high aesthetic function when screwed in. It is also desirable for the screw in accordance with the invention to be able to absorb transverse tensile forces well, for example better than screws having sealing rings, and to not loosen by themselves, to not susceptible to contact corrosion, to provide a reliable seal over a long period of time and to minimise its intrusion into other material and/or errors in assembly.

One or more of the stated objects are achieved with by the screw according to claim 1 and the screw assemblage according to co-ordinated claim 12. Advantageous developments follow from the dependent claims, the description and the figures.

The screw in accordance with the invention comprises a screw head and a screw shaft which protrudes from an underside of the screw head and has a self-forming or self-tapping thread, wherein the underside of the screw head has a bearing area and an annular recess extending around the shaft between the bearing area and the shaft, wherein a coating made of a sealant is attached to the underside of the screw head. The sealant is preferably elastic. Alternatively or additionally, the sealant preferably contains 40 to 90, more preferably 50% to 85% or 60% to 80% by weight of a resin component consisting of a polymeric resin or a mixture of two or more polymeric resins.

The screw assemblage comprises: a screw in accordance with the invention; a first body, for example a flat or planar body; and a second body, for example a flat or planar body, wherein at least the second body has an internal thread produced by screwing in the screw, wherein the first body is enclosed, in particular clamped, between the screw head and the second body, the thread of the screw is in engagement with the internal thread of the second body, and the plastic material is situated between the bearing area and the first body.

The invention is based on a screw, in particular a metal-construction screw. The screw comprises a screw head and a screw shaft which protrudes from the underside of the screw head and has a thread, in particular a self-forming or self-cutting thread.

A self-forming or self-tapping thread (external thread) is understood to mean threads which produce the flights of the internal thread as the screw is being screwed in, by material deformation and without removing material or substantially without removing material.

The screw can for example be formed as a self-cutting screw. A self-cutting screw is understood to mean a screw which produces a core drill hole for the screw shaft as the screw is being screwed in, in particular by removing material, i.e. pre-drilling is not absolutely necessary. The internal thread can be produced in the circumferential wall of the core drill hole by the self-forming or self-tapping external thread as the screw is being screwed in.

The screw shaft can for example be cylindrical or can have a cylindrical portion. The thread can be formed on the cylindrical portion. Alternatively, the screw shaft can taper from the screw head or slightly short of the screw head up to the free end of the screw shaft and can in particular be formed conically. The thread can for example extend on the screw shaft, in particular on the conical or cylindrical screw shaft or portion of the screw shaft, up to the screw head or slightly short of the screw head.

The underside the screw head, i.e. the side on which the screw shaft protrudes from the screw head, can have a bearing area in order for the screw head to rest on or contact the body, in particular the screw assemblage into which the screw is screwed. Between the bearing area and the shaft, the screw head has at least one annular or spiral-shaped recess which extends around the shaft, in particular a flute or annular groove. The bottom of the recess is set back in the screw head with respect to the bearing area. Multiple annular recesses, which are preferably concentric with respect to each other, can for example be provided.

A coating which is made of a sealant and adheres to the underside is attached to the underside of the screw head.

The coating is preferably embodied such that it is dry and/or dry to the touch and in particular non-sticky and/or non-wetting within the specified temperature range, in particular at least at room temperature. As a result, the coating does not wear off and remains adhered to the screw head when it is touched by an object or a user. This enables the screw to be easily processed and stored, for example in the form of a bulk good. As opposed to processing screws in which a liquid sealant is applied to the screw shaft immediately before processing, this operating step is omitted for the screw in accordance with the invention. Preferably, the sealant in accordance with the invention dries physically and does not have to be cured either thermally or chemically.

In developments, the screw head can have a circumferential flange which protrudes circumferentially and in particular from the rest of the screw head, wherein the bearing area is at least partially formed by the underside of the flange, for example completely, but preferably at least partially also by the underside of the rest of the screw head.

The screw head can ideally have a screw driving profile which is adapted to co-operate with a tool in a way which transmits torque. Such screw driving profiles are known in their own right. Examples of such a screw driving profile include for example an external hexagon, an internal hexagon, an external polygon, an internal polygon, so-called Torx® profiles, a longitudinal slot, a cross slot, etc.

The screw shaft can for example be perpendicular or substantially perpendicular with respect to the bearing area, i.e. the bearing area can abut, over as great an area as possible, the body into which the screw is being screwed. The bearing area, with respect to which the screw shaft or its longitudinal axis is for example perpendicular or substantially perpendicular, can be annular or shaped as a flat circular ring. It can be arranged concentrically with respect to the longitudinal axis of the screw shaft. The bearing area can for example have a radial width which is greater than or equal to the radial width of the recess, wherein the radius relates to the longitudinal axis of the screw shaft. Alternatively or additionally, the bearing area can be level or substantially level in its radial width and perpendicular or substantially perpendicular to the longitudinal axis of the bearing area. In other words, the surface normal of the bearing area, which is preferably a level bearing area, can be parallel or substantially parallel to the longitudinal axis of the screw shaft.

The bearing area can for example have a value A which is at least 30% of the total area TA under the screw head less the cross-section C of the (screw) shaft which lies in the plane of the bearing area:

$$A \geq 0.3 \cdot (TA - C) \qquad \text{Formula 1}$$

The value A of the bearing area can preferably be at least 40%, more preferably at least 50%, even more preferably at least 60% or at least 70% or at least 80% and up to at most 90% or 95% of the total area TA under the screw head less the cross-section C of the screw shaft which lies in the plane of the bearing area, wherein the bearing area is for example delineated by the annular recess.

It can therefore be advantageous to provide a screw having an external diameter of the head of 8 to 12 mm with a bearing width of at least 1.5 mm, a screw having an external diameter of the head of 13 to 20 mm with a bearing width of at least 2.0 mm, and a screw having an external diameter of the head of more than 20 mm with a bearing width of at least 2.5 mm, if commercially available shaft diameters are taken as a basis.

Mention may be made by way of example of 6-gauge screws having a value A of preferably 70% to 85%, in particular 75% to 82% or about 80% of the total area TA under the screw head less the cross-section C of the screw shaft which lies in the plane of the bearing area, 10-gauge screws having a value A of preferably at least 50% to 68%, in particular 55% to 66% or about 63% of the total area TA under the screw head less the cross-section C of the screw shaft which lies in the plane of the bearing area, and 20-gauge screws having a value A of at least 30% to 45%, in particular 35% to 42% or about 40% of the total area TA under the screw head less the cross-section C of the screw shaft which lies in the plane of the bearing area.

Due to the bearing area in accordance with the invention, the bearing pressure is distributed when the screw is tightened, thus protecting the surface of the planar body into which it is screwed, in order inter alia to maintain tightness, as opposed to screws which have a sharp-edged periphery or a conical underside of the screw head, in which all the contact pressure is pressed into the planar body via the periphery.

The screw shaft can for example have a drilling portion featuring at least one cutting edge, preferably two circumferentially opposing cutting edges. The thread of the screw shaft is formed between the at least one cutting edge and the screw head. The free end of the screw shaft can for example form a tip having a tip angle of between 90° and 170°. The at least one cutting edge can be formed in the region of the tip. The screw shaft can also have a groove for each cutting edge, which adjoins the cutting edge and can be formed helically or linearly, i.e. parallel to the longitudinal axis of the screw shaft, and which is in particular open towards the circumference of the screw shaft. The at least one groove can extend over only some of the screw shaft, wherein the thread is formed between the groove and the screw head. The groove serves on the one hand to provide the cutting surface for the at least one cutting edge and, on the other hand, to accommodate the chippings produced by the at least one cutting edge in the drilling process. The tip of the screw shaft can for example be hardened at least in the region of the cutting edges. The rest of the shaft, in particular in the region of the thread can be non-hardened and/or can have a lesser hardness than the tip or the at least one cutting edge. The region of the shaft in which the at least one cutting edge and/or the groove provided for accommodating the chippings is/are situated can for example be formed with no thread.

The shaft can for example have a portion which tapers towards the free end of the shaft, which is in particular formed as a tip or rounded tip, wherein the thread is at least partially formed between said portion and the screw head, wherein the tapering portion is provided with no thread or with some of the thread.

The thread of the shaft can for example extend over the tapering distance up to the tip. When screwing the screw into for example a metal sheet which has not been pre-drilled, the thread of the screw tip can firmly grip the material of the metal sheet as the screw is screwed in and draw the screw into the metal sheet.

Alternatively, the tapering portion can be formed with no thread, in particular for forming friction-drilled holes. The shaft can for example be formed to have a non-circular or approximately polygonal or oval cross-section, or alternatively a round or circular cross-section, in the region of the tip or tapering portion. The tip which adjoins the tapering region can preferably be rounded.

The coating can be arranged and in particular adhered at least in the region of the bearing area. Optionally, the coating can also be arranged in the region of the at least one recess (flute) and/or in the region of the shaft. The coating can be arranged in the at least one annular recess or can span the annular recess. The coating can cover a region on the shaft, in particular a partial region on the shaft, preferably including at least one and particularly preferably at least two or three flights of the thread. It can preferably be limited to a maximum of eight flights or a maximum of six flights and/or to a maximum of four flights or even three flights of the thread.

When the screw is screwed into the body or bodies to form a screw assemblage, the underside of the screw head together with the coating arranged on it is pressed against the body, thus sealing off the region radially outside the coating in relation to the region radially inside the coating and/or the region of the screw assemblage into which the screw shaft is screwed. If the coating is also attached in the region of the annular recess and/or to the screw shaft, the seal can be further improved or reinforced.

The at least one recess serves to accommodate material of the body into which the screw is being or will be screwed. By screwing the screw into the body, a burr or at least one chipping can be produced around the threaded drill hole, which can inhibit the bearing area from resting as fully as possible on the body and thus impair the sealing effect. The annular recess can serve to accommodate this burr or at least one chipping, if it is not already ejected during the screwing process, thus allowing the coating of the bearing area to abut the body, forming a reliable seal.

In developments, the layer thickness of the coating when the screw is not screwed in can be at least 0.1 mm, preferably at least 0.2 mm, most particularly preferably at least 0.4 mm and in particular at most 0.9 mm, preferably at most 0.8 mm, most particularly preferably at most 0.7 mm, for example 0.4 to 0.6 mm, at least on the underside of the bearing area, in particular outside the region of the recess. When the screw is screwed in, the layer thickness can be pressed down to 0 mm, if only the surface roughness is merely filled. For when the screw is screwed in, layer thicknesses in the range of 0.01 to 0.4 mm, in particular 0.1 to 0.2 mm, are preferred. It has been found that these layer thicknesses enable an optimum sealing effect while simultaneously saving on material for the coating.

The invention also relates to a screw assemblage which comprises a screw in accordance with the invention and a first body and a second body. At least the second body can have an internal thread which is produced by screwing in the screw, wherein the first body is enclosed, in particular clamped, between the screw head, in particular the underside of the screw head, and the second body. Optionally, the first body can also have an internal thread. The thread of the screw is in engagement with the internal thread of the second body, and the plastic material and/or coating is situated between the bearing area and the first body.

The first body can for example be flat or planar and in particular formed as a sheet or metal sheet. The first body can for example be formed from metal (including metal alloys), wood or plastic or a composite material, in particular a composite material made of these. The surface facing the screw head is preferably smooth or at least conditioned such that the coating on the underside of the screw head seals off the contact gap between the surface and the coating. The surface can for example be formed by a layer of metal or plastic which is formed by or on the first body.

The second body can for example be flat or planar and in particular formed as a sheet or metal sheet. The second body can for example be formed from metal (including metal alloys), wood or plastic or a composite material, in particular a composite material made of these.

Two metal sheets (corresponding to the first and second bodies) can for example be connected by the screw in accordance with the invention. In another example, a metal sheet which corresponds to the first body can be attached to a second body made of wood or plastic. The examples mentioned are to be understood merely as examples and do not exclude other combinations of first and second bodies.

In particular, the coating can be deformed, and in particular its layer thickness reduced, when producing the screw assemblage. The material of the coating can for example flow, in particular radially outwards and/or radially inwards, i.e. towards the shaft, in particular into the annular recess. The coating or at least some of it can for example be elastically and/or plastically deformed by pressing the screw head onto the first body in order to form a bead which partially or completely encircles the screw head on the outer edge of the screw head.

The coating which remains between the bearing area and the first body reliably seals off the region radially outside the bearing area in relation to the region radially inside the bearing area or the threaded drill hole. The material can also leave the bearing area of the head and enable contact between the parts to be joined; this enables high durability and, by filling the surface roughness, a reliable seal against surrounding media.

The partially or completely circumferential bead, formed from the coating which is displaced radially outwards, provides an even better seal. The bead also protects the part of the coating which remains between the underside of the screw head and the first body, for example from UV light radiation coming for example from the sun, thus enabling the durability of the seal to be even further improved and intrusion into other material to be prevented or reduced.

In one embodiment, the first body can have a transit hole, in particular a hole produced by drilling or punching or in some similar way, the diameter of which is greater than the external diameter of the external thread of the screw shaft and through which the screw shaft extends. In such an embodiment, the screw does not need to produce a thread in the first body.

In an alternative embodiment, the first body can have an internal thread produced by screwing the screw in, wherein the thread of the screw is in engagement with the internal thread of the first body and in particular also in engagement with the internal thread of the second body.

The sealant attached to the underside of the screw head can preferably be elastic. The sealant can in particular be elastic over the entire range between $-10°$ C. and $+100°$ C., in particular between $-40°$ C. and $+150°$ C.

Elasticity refers to the property of polymers which, after being deformed, reversibly return to their initial state, wherein the initial state is entropically more favorable (less ordered as a "wad") than the stretched state in which polymer chains are arranged in parallel. Rubber elasticity in polymers generally occurs at temperatures in the range between the glass transition temperature and the decomposition temperature (elastomers) or softening temperature (crystalline and partially crystalline thermoplastics). By contrast, the sealants used in accordance with the invention are capable of not only elastic but also plastic deformation under the conditions of being screwed in.

The sealant and in particular its resin component has elasticity preferably at least in the range and particularly preferably over the entire range of −10° C. to +100° C., more preferably also above 130° C. or even more preferably up to 200° C. The sealant and in particular its resin component has elasticity preferably down to −30° C. or even −40° C. It is preferably dry to the touch and non-sticky and non-wetting at room temperature and standard pressure or under the processing conditions, for example between −10° C. and +50° C. and even up to 100° C. or 130° C. or even 200° C. The person skilled in the art will understand "dry to the touch" to mean the state of coated parts in which no perceptible amounts of material are transferred when they are touched by hand or with an absorbent material.

The person skilled in the art will understand the property "non-sticky" to mean that the cohesive forces of the sealant are always higher than the adhesive forces with respect to adjacent materials such as for example a hand or glove. In this way, the sealant does not produce threads, it is pleasant to work with, and the layer thickness is in particular not altered by normal working conditions such as being gripped, stored or similarly influenced. The polymer preferably has a strength at room temperature (23° C.) of 2 N/mm$^2$ to 10 N/mm$^2$.

In accordance with the invention, the sealant can in particular contain 40% to 90% by weight of a resin component consisting of a polymeric resin or a mixture of two or more polymeric resins, wherein if there is one resin, it is preferably elastic, and if there are multiple polymeric resins, they are preferably elastic or comprise elastic resin or resins.

The sealant can for example and preferably be a non-reactive sealant; the resin component preferably consists of one or more non-reactive polymeric resins.

The resin component of the sealant can therefore particularly preferably be non-reactive. The person skilled in the art will understand a non-reactive polymeric resin to mean a polymer which does not cure chemically in order to fulfil its sealing and/or adhering function. Suitable non-reactive polymeric resins include in principle for example acrylates, acrylate copolymers, polyolefins, silicones, plastisols, polyamides, polyvinyl chloride (PVC), acrylonitrile/chlorinated polyethylene/styrene, butadiene rubber, chloroprene rubber, ethylene-propylene copolymer, ethylene-propylene-diene-(monomer) rubber EPDM, ethylene vinyl acetate, fluororubber, isoprene rubber, natural rubber, polyether block amide, polyhydroxyalkanoates, polyhydroxybutyrate, polyisobutylene, polyurethane, polyvinyl butyral, styrene butadiene rubber, styrene butadiene styrene, vinyl chloride/ethylene. The most preferred are acrylates and acrylate copolymers. Examples of particularly suitable acrylate copolymers include: acrylonitrile/butadiene/acrylate, acrylonitrile/methacrylate, ethylene ethyl acrylate copolymer, vinyl chloride/ethylene/methacrylate. By contrast, polymethyl methacrylate is for example not preferred as a polymeric resin of the resin component because of its lack of elasticity.

The resin component of the sealant can preferably comprise one or more acrylate polymers and/or one or more acrylate copolymers; in particular, the resin component can preferably consist of acrylate polymers and acrylate copolymers.

Silicones are for example not preferred because of their relatively low elongation at break. Polyolefins are for example not preferred because of their low temperature resistance, in particular with regard to their dimensional stability and/or chemical resistance. Plastisols (unhardened and hardened) are not preferred inter alia because of the plasticisers they contain and their reduced durability and environmental compatibility due to leaching. Polyamides, PVC and other polymerised sealants are likewise not preferred because of their low elasticity and elongation at break. Polyurethanes are not preferred because they lack stability and have high intrusion into other material.

The sealant in accordance with the invention can however, in its most general terms and not preferably, also be a firm-to-the-touch and dry curing polymer, for example a thermosetting polyurethane.

The sealant can ideally consist of a single component which can be easily applied and is non-curing, in particular non-thermosetting, wherein the sealant can preferably be applied as a dispersion, in particular an aqueous dispersion, and then dried to a constant weight.

The sealant dispersion for applying can preferably contain additives, for example inorganic and/or organic dyes or pigments (with a particle size typically defined by a median of 1.5 to 6 μm, preferably 2 to 4 μm), wetting agents, brighters, solubilisers, fillers (with a particle size typically defined by a median of 1.5 to 6 μm, preferably 2 to 4 μm), defoamers, ionic and/or non-ionic thickeners, corrosion inhibitors, antioxidants, friction modifiers, lubricants and/or rheological additives.

In a preferred embodiment, the sealant can be applied as an aqueous dispersion, wherein the aqueous dispersion contains:
  30% to 80% by weight, preferably 40% to 70% by weight, in particular 50% to 60% by weight of aqueous resin dispersion;
  15% to 55% by weight, preferably 20% to 50% by weight, in particular 30% to 40% by weight of additives;
  5% to 30% by weight, preferably 7% to 20% by weight, in particular 10% to 15% by weight of water.

The dispersion to be applied can for example have the following composition:
  15% to 20% by weight of an aqueous high-solids dispersion (60% to 65% solids) of a highly elastic acrylate copolymer (having a glass transition temperature below −10° C.);
  35% to 42% by weight of an aqueous high-solids dispersion (60% to 65% solids) of a highly elastic acrylate polymer (having a glass transition temperature between 5° C. and 15° C.);
  5% to 15% by weight of an aqueous dispersion of a lubricant (for example wax; particle size at least 98%<8.5 μm, median between 2 and 4 μm; dropping point of the wax 100° C. to 130° C., 40% to 50% solids);
  2% to 8% by weight of an aqueous paste of inorganic pigments (47% to 55% solids);
  10% to 15% by weight of fillers (for example inorganic carbonates);
  5% to 10% by weight of other additives (for example wetting agents, brighters, solubilisers, defoamers, thickeners);
  with the remainder water.

In its state as a dispersion, the sealant is easy to process and viscous; the dynamic viscosity (measured using an Anton Paar MCR 92 rheometer) according to DIN 53211:1987-06 and DIN 2431:2020-02 at room temperature (22°

C.) can be in the range of 12000 to 1300 mPa·s, in particular 8000 to 1800 mPa·s or even 6000 to 2300 mPa·s at 1 rpm, in the range of 900 to 100 mPa·s, preferably 800 to 125 mPa·s, in particular 650 to 150 mPa·s or 500 to 175 mPa·s at 100 rpm and in the range of 500 to 25 mPa·s, preferably 450 to 35 mPa·s, in particular 350 to 50 mPa·s or 250 to 65 mPa·s at 1000 rpm, each particularly preferably:

| rpm | Viscosity in mPa · s |
|---|---|
| 1 | 1800 |
| 100 | 150 |
| 1000 | 50 | or:

| rpm | Viscosity in mPa · s |
|---|---|
| 1 | 8000 |
| 100 | 650 |
| 1000 | 350 |

Once dried, the sealant is preferably dry to the touch, no longer soluble or dispersible in water and preferably amorphous. In addition to its elastic properties, the sealant preferably also has in accordance with the invention the property of "super-toughness". A super-tough material is not only elastically but also plastically deformable under pressure. It "flows" so to speak into available flutes, cracks, recesses and cavities, while materials which are not super-tough, such as for example cured thermosetting plastics including reactive sealants or adhesives, crumble under pressure. Material which are "super-tough" are for example understood to be those which show an elongation at break of 150% to 250% in a high-speed tensile test below 200 mm/min according to ISO 18872:2007-02 and EN ISO 527-1:2019-11. Accordingly, the sealant in accordance with the invention preferably shows an elongation at break of in particular 170% to 230% or ideally 180% to 200%. Alternatively, a sealant can be referred to as "super-tough" if, in a test to determine the breakaway torques and prevailing torques (according to DIN 267-27), a prevailing torque is measured which at 100° rotation is still at least 80% of the breakaway torque, preferably at least 90% of the breakaway torque, most particularly at least 100% of the breakaway torque, wherein the material does not alter its structure and/or is not destroyed, such that the test can be repeated with similar values and a breakaway torque peak is not reached even after a typical curing time of for example 24 hours.

The sealant can for example have a Shore A hardness of 20 to 100, in particular 20 to 90 or 30 to 50, in particular 40±5, as measured according to DIN EN ISO 868:2003-10.

The applied and dry-to-the-touch sealant preferably has very good adhesion. In an adhesion test on a flat steel surface according to DIN EN ISO 2409:2013-06, at least good adhesion (rated 1 of 0 to 4) is preferably achieved, with damage along the cut edges of at most 5%.

The pre-applied sealant of the invention eliminates for the first time the need for additional sealing devices such as "O rings" or sealing discs, for example the usual EPDM sealing discs, and the associated risk of errors, for generic screws such as for example construction screws. The seal produced in accordance with the invention is long-lasting due to resistance to temperature, water and chemicals, for example oil, alcohol, petrol, organic solvents and acidic or alkaline environmental influences. It is dimensionally stable, in particular when using non-reactive and/or non-hardening sealants.

The temperature resistance of the sealing effect of the sealant can for example be determined in a method according to DIN 267-27:2009-09, which provides for aging at 20° C., 100° C., 150° C., 170° C. and 200° C. for 1000 hours and at room temperature as the test temperature. Preferably, no leak in the sealant to be used in accordance with the invention is detected.

The chemical resistance can for example be determined in a method according to DIN 267-27:2009-09. Preferably, no leak in the sealant used in accordance with the invention is detected within 10 minutes in a test at under 6 bars after 7 days of exposure in various liquid media (for example 100% glycol, 1:1 water/glycol mixture).

Adhesion and cohesion values can be expressed by determining the installation torques according to DIN 267-28: 2009-09. The assembly torque $M_{ass}$ is preferably in the range of 2 to 10 Nm, particularly preferably 3 Nm to 7 Nm (based on ISO 4017 M10×35-8.8-black oxide screws and ISO 4032 M10-10-black oxide nuts, tested according to DIN 267-28:2009-09).

The UV resistance of the sealant can be determined according to DIN EN ISO 4892-11:2016-10 under artificial UV light (Node UV lamp UV-250 (G spectrum) with an intensity of 30 mW/cm$^2$). Preferably, no measurable change in the Shore hardness, elasticity or elongation at break and/or tearing strength occurs in the sealants used in accordance with the invention after two weeks of irradiation.

In addition to being coated with a sealant, the screw in accordance with the invention can also be coated with a reactive adhesive, for example a two-component adhesive which is dry to the touch. Without an additional adhesive coating, the screw in accordance with the invention can preferably be suitable for repeated use.

BRIEF DESCRIPTION OF THE FIGURES

The invention has been described on the basis of multiple embodiments and examples. An embodiment is described below on the basis of figures. The features thus disclosed, individually and in any combination of features, advantageously develop the subject-matter of the claims. There is shown:

DESCRIPTION OF EXEMPLARY EMBODIMENTS

Figure 1:
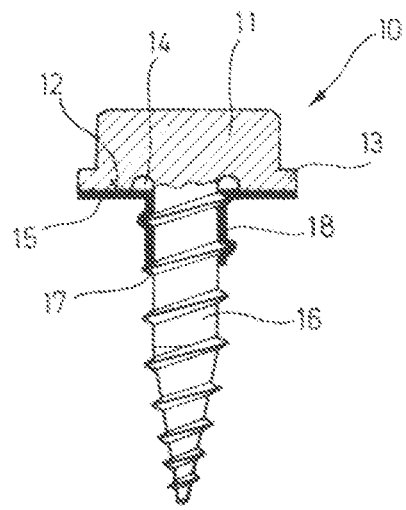
FIG. 1 a side view of a screw in accordance with the invention.
Figure 2:
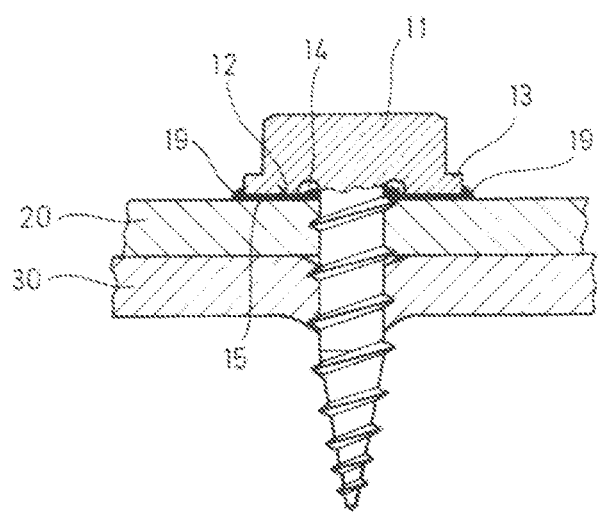
FIG. 2 a screw assemblage comprising a first and second planar body and the screw according to FIG. 1.

The screw 10 from FIGS. 1 and 2 has a screw head 11 and a screw shaft 16 which protrudes from the underside of the screw head 11. The underside of the screw head 11 has a bearing area 12 for supporting on a body 20 of a screw assemblage (FIG. 2). The screw head 11 has a flange 13 which is circumferential over the outer circumference of the screw head 11 and protrudes radially outwards in relation to the rest of the screw head 11. The bearing area 12 is formed by the underside of the screw head 11, wherein a part is formed by the flange 13. The screw head 11 has a screw driving profile which is adapted to co-operate with a tool in a way which transmits torque. The screw shaft 16, which in particular protrudes perpendicularly or normally from the bearing area 12, has an external thread, in particular a non-metric external thread, via which the screw 10 can be screwed into at least one body 20, 30.

The screw shaft 16 has a substantially cylindrical portion, wherein at least the cylindrical portion has the external thread 17. In the example shown, the side of the screw shaft 16 protruding from the cylindrical portion has a tapering, in particular conically tapering portion which forms a tip at the free end of the screw shaft 16. In the example shown, the thread 17 extends not only over the cylindrical part of the screw shaft 16, but also over the tapering part of the screw shaft 16, up to or almost up to the tip.

The thread 17 is formed as a self-tapping or self-forming thread. The screw 10 can be screwed into a body 20, 30 without this necessarily requiring a core hole or any drill hole.

The screw 10 is preferably provided or designed for screwing into thin, planar bodies, for example metal sheets. Two metal sheets or bodies 20, 30 can be connected with the aid of the screw 10, to produce a screw assemblage (FIG. 2).

The bearing area 12, which is in particular a level bearing area 12, encircles the screw shaft 16 annularly or in the shape of a flat circular ring. An annular recess 14, which in the example shown is formed as a flute or groove, is arranged between the bearing area 12 and the screw shaft 16. The recess 14 delineates the bearing area 12, which is in particular formed as a circular annular surface, towards the screw shaft 16, i.e. radially inwards. The outer circumference of the screw head 11 or flange 13 delineates the bearing area 12 radially outwards. The bottom or base of the recess 14 is set back into the screw head 11 with respect to the bearing area 12. The flanks of the recess 14 transition, preferably in a rounded way, into the bottom or base of the recess 14. Notch effects within the recess 14 are thus advantageously avoided.

A coating which is arranged on the underside of the screw head 11 partially or completely covers at least the bearing area 12. In the example shown, the coating 15 also spans the recess 14 and also extends partly over the screw shaft 16, in particular the cylindrical part of the screw shaft 16, as indicated by the reference numeral 18. In the region 18, the coating 15 extends over preferably at least one, two or three flights, up to and including all of the flights, of the thread. In some embodiments, however, the coating preferably does not extend over all the flights, but rather for example only over one, two or three flights of the thread. In the example embodiment shown, the region 18 extends over two flights of the thread. The tapering part of the screw shaft 16 preferably does not comprise the coating 15.

The coating 15 is embodied as a preferably elastic sealant. The sealant is in particular elastic between −10° C. and +100° C. and preferably over the entirety of this range. The coating 15 is preferably embodied such that it is firm to the touch, i.e. not sticky to the touch. This enables the screw to be stored and handled as a bulk good, wherein it may be added for clarification that the screw does not necessarily of course have to be provided as a bulk good, but can also be provided in a different form, for example in so-called screw magazines.

The screw assemblage shown in FIG. 2 comprises the screw 10 according to FIG. 1 or another variant of a screw in accordance with the invention mentioned herein, a first planar body 20 and a second planar body 30. In the example from FIG. 2, the first body 20 and the second body 30 have an internal thread produced by screwing the screw 10 in, wherein the first body 20 is enclosed or clamped between the screw head 11 and the second body 30. When the screw assemblage is complete, the external thread 17 of the screw 10 is in engagement with the internal thread of the first body 20 and second body 30. The underside of the screw head 11 is supported on the top side of the first body 20, i.e. the side or surface of the first body 20 facing the screw head 11, by the bearing area 12 which is provided with the coating 15. By tightening the screw and increasing the contact pressure or contact force of the screw head 11 on the first body 20, the coating 15 is at least partially displaced from the gap between the bearing area 12 and the top side of the first body 20, in particular radially outwards, i.e. towards the outer side of the screw head 11, and/or inwards, i.e. towards the shaft 16 and/or recess 14. The coating 15 which remains between the bearing area 12 and the first body 20 seals the region outside the screw head 11 in relation to the threaded drill hole(s) in which the screw shaft 16 is situated, in particular in a gas-tight and/or liquid-tight seal. The part of the coating 15 which is displaced radially outwards can form a bead 19 which encircles the screw head 11.

The recess 14 serves to accommodate a burr which is formed for example by screwing the shaft 16 into the first body 20 and which protrudes beyond the top side of the first body 20. The recess 14 also serves to accommodate some of the coating 15. The recess 14 thus ensures that any burr present does not or not substantially impair the sealing effect between the bearing area 12 and the top side of the first body 20. Alternatively or additionally, the material of the coating 15 accommodated in the recess 14 or displaced into the recess 14 can even develop a sealing effect in said recess 14, in particular using the burr or at least one chipping which may be present. This further improves the sealing effect.

The sealant of the coating 15 preferably shows a certain flow behaviour due to its plastic and elastic properties when being screwed in, such that the sealant substantially fills the surface roughness between the bearing area 12 and the top side of the first body 20 and thus contributes to the sealing function. Displacing the material to the side which is not subject to a load and thus filling the whole thread gap can also lead to an improvement in the seal. In addition, the sealant can preferably form an additional bead on the periphery of the surfaces (not shown in the drawing) which can fulfil an additional gasket function.

The coating 15 or 18 which is optionally arranged on the shaft 16 can seal off the region between the internal diameter of the internal thread of the first body 20 and/or second body 30 and the external diameter of the screw shaft 16, in particular the cylindrical part. Any material of the coating 15 which is displaced by the screw shaft 16 as the screw 10 is screwed into the first and second bodies 20, 30 can in particular be displaced into the recess 14 and/or accommodated in the recess 14.

As an alternative to the transit hole for the screw shaft 16 which is produced by screwing the screw 10 into the first body 20, the first body 20 can have a transit hole, the diameter of which is greater than the external diameter of the thread 17 in the region of the cylindrical part of the shaft 10.

Example 1

Comparative screws in accordance with FIG. 1 were produced and coated with different sealants to a layer thickness of 0.5 mm on the underside of the bearing area outside the recess, wherein the sealant also covered the recess and the adjoining shaft up to and including two flights of the thread.

Sealant compositions applied as aqueous dispersions and containing elastic acrylate or polyamide or non-elastic acrylate or polyurethane were tested as sealants. Alternatively, an EPDM sealing ring was tested. The best tightness and strength of the screw connection were achieved using the elastic sealant containing elastic acrylate.

This screw, which was coated with elastic acrylate in accordance with the invention, also proved superior to an otherwise identical screw which was provided with an EPDM sealing ring. The screw coated in accordance with the invention was able to achieve good tightness values even under tightening torques which press over the EPDM disc and thus destroy its sealing effect, and also withstood relative movements better than EPDM.

Example 2

The following comparative tests between a super-tough and elastic acrylate-based sealant, as used in accordance with the invention, and non-elastic, anaerobically curable, i.e. reactive acrylate adhesives were also carried out.

In order to demonstrate the difference in fracture behaviour between the sealant used in accordance with the invention and anaerobically curable acrylate adhesives using the example of two adhesive surfaces bonded using anaerobically curable acrylate adhesive, two metal strips were each coated and bonded with Loctite 577 and Weicon AN 306-01, respectively. An elastic and super-tough acrylate-based sealant was also attached between two metal strips as an example in accordance with the invention.

The metal strip laminates were clamped in screw clamps and tested for fracture behaviour/toughness, wherein it was found that the sealant used in accordance with the invention shows an elastic behaviour in combination with the necessary adhesion and cohesion and in particular also super-toughness, while anaerobically cured acrylate adhesives are hard and fail suddenly.

Example 3

In another comparative test, the adhesion/cohesion between the screw and the planar body was investigated. It was found that in the screw under-head coated in accordance with the invention, the elastic and super-tough sealant "flows" into all the gaps and roughness when pressed and is partially pushed out of the gap, where it is firm to the touch and immediately dry, whereas the anaerobically hardening adhesive can only be applied in a thin layer and only cures where there is no oxygen. All the material which is pressed out of the gap does not cure and remains sticky and moist.

The breakaway torque of screws coated with various reactive Loctite® acrylate adhesives/sealants (Loctite® 561, 577 and 511) was also measured and compared with that of the same screws which were coated in accordance with the invention with a non-reactive elastic acrylate-based sealant. While the Loctite®-coated screws showed a sharp breakaway torque featuring a torque peak at around 10° and then quickly fell away (less than 50% of the breakaway torque was consistently measured at 20°), the screws coated in accordance with the invention showed a significant prevailing torque, and significantly more than 50% of the breakaway torque was still retained even at 300°. Even after 24 hours, the sealant of the screws coated in accordance with the invention retained its toughness.

Example 4

Anaerobically curing (i.e. reactive, non-elastic) adhesives cannot be precoated, as the following comparative test shows.

One screw was coated with a super-tough, elastic, acrylate-based sealant, while two other screws were coated with anaerobically curing, non-elastic, acrylate sealant/adhesive.

A paper smear shows that a coating which is dry and firm to the touch and which can be precoated is only achieved in accordance with the invention. If the correspondingly coated screws are screwed in immediately after being coated, it is also found that the screws in accordance with the invention are firm to the touch from the first second after being screwed in. The sealant which is dry and firm to the touch and which is pressed out from under the screw head still has elastic and super-tough properties and retains its super-tough and elastic properties even after mechanical testing. By contrast, the anaerobically curing acrylate sealant which emerges as a liquid still smears even 24 hours after screwing.

LIST OF REFERENCE NUMERALS 10 screw
11 screw head
12 bearing area
13 flange
14 recess, in particular a flute or an annular groove
15 coating
16 screw shaft
17 external thread
18 part of the coating 15 in the region of the screw shaft 16
19 bead
20 first flat or planar body, in particular a metal sheet
30 second flat or planar body, in particular a metal sheet

The invention claimed is:

1. A screw (10) comprising:
a screw head (11) and a screw shaft (16) which protrudes from an underside of the screw head (11) and has a self-forming or self-tapping thread (17), wherein the underside of the screw head (11) has a bearing area (12) and at least one annular recess (14) extending around the shaft (16) between the bearing area (12) and the shaft (16), wherein a coating (15) made of an elastic non-reactive sealant is attached to the underside of the screw head (11), characterized in that the sealant comprises a resin component comprising one or more acrylate polymers and/or one or more acrylate copolymers, and characterized in that the shaft (16) is perpendicular or substantially perpendicular with respect to the bearing area (12) such that the bearing area can abut, over as great an area as possible, the body into which the screw (10) is being screwed.

2. The screw (10) according to claim 1, characterised in that the shaft (16) has a drilling portion featuring at least one cutting edge, wherein the thread (17) is formed between the drilling portion and the screw head (11).

3. The screw (10) according to claim 1, characterised in that the shaft (16) has a portion which tapers towards the free end of the shaft (16), which is in particular formed as a tip or rounded tip, wherein the thread (17) is at least partially formed between said portion and the screw head (11), wherein the tapering portion is provided with no thread (17) or with some of the thread (17).

4. The screw (10) according to claim 1, characterised in that the layer thickness of the coating (15) outside the region of the recess (14) is between 0.1 mm and 0.9 mm.

5. The screw (10) according to claim 1, characterised in that the sealant contains 40% to 90% by weight of a resin component consisting of a polymeric resin or a mixture of two or more polymeric resins, wherein the resin or resins preferably comprise or consist of elastic resin or resins.

6. The screw (10) according to claim 1, characterised in that the resin component of the sealant consists of acrylate polymers and acrylate copolymers.

7. The screw (10) according to claim 1, characterised in that the sealant shows an elongation at break of 150% to 250%, in particular 170% to 230%, in a high-speed tensile test at 200 mm/min according to ISO 18872 and EN ISO 527-1.

8. The screw assemblage according to claim 7, characterised in that the first body (20) has a transit hole, the diameter of which is greater than the external diameter of the thread (17) and through which the shaft (16) extends.

9. The screw assemblage according to claim 7, characterised by a bead (19) which encircles the screw head (11) and is in particular formed by some of the coating (15).

10. The screw (10) according to claim 1, characterised in that the polymeric sealant also covers a region (18) on the shaft (16), preferably including at least one and particularly preferably at least two or three flights of the thread.

11. A screw assemblage, comprising a screw (10) according to claim 1, a first body (20) which is for example flat or planar, and a second body (30) which is for example flat or planar, wherein at least the second body (30) has an internal thread produced by screwing in the screw (10), wherein the first body (20) is enclosed, in particular clamped, between the screw head (11) and the second body (30), the thread (17) of the screw (10) is in engagement with the internal thread of the second body (30), and the sealant of the coating (15) is situated between the bearing area (12) and the first body (20).

12. The screw assemblage according to claim 11, characterised in that the first body (20) has an internal thread produced by screwing in the screw (10), wherein the thread (17) of the screw (10) is in engagement with the internal thread of the first body (20).

* * * * *